UNITED STATES PATENT OFFICE.

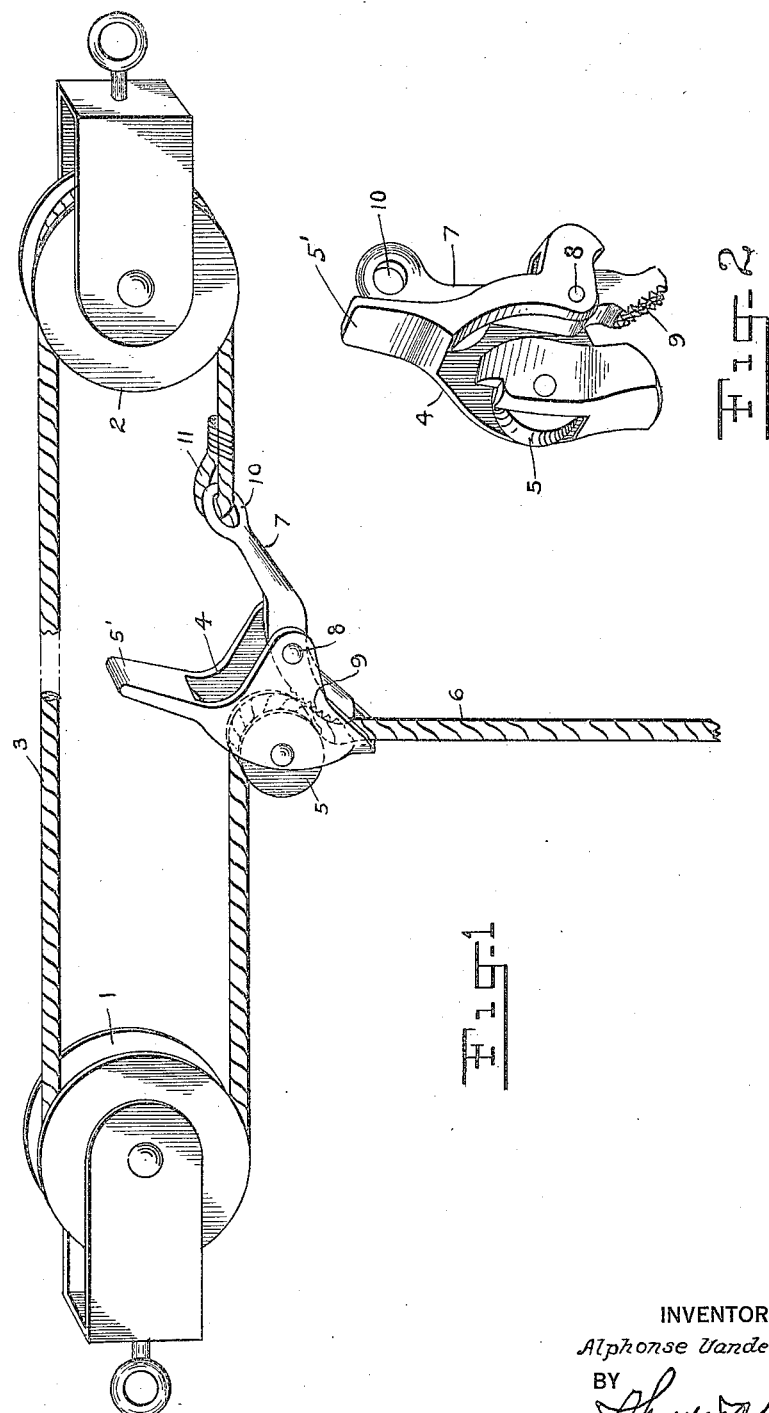

ALPHONSE VANDERDONCK, OF BROOKLYN, NEW YORK.

LINE-HOLDING DEVICE.

1,372,789. Specification of Letters Patent. Patented Mar. 29, 1921.

Application filed August 16, 1920. Serial No. 404,004.

*To all whom it may concern:*

Be it known that I, ALPHONSE VANDERDONCK, a citizen of the United States, residing at Brooklyn, in the county of Kings and State of New York, have invented certain new and useful Improvements in Line-Holding Devices, of which the following is a specification, reference being had therein to the accompanying drawing.

My invention relates to improvements in line tightening devices and more particularly has reference to a pulley and ratchet device adapted to be secured upon a line so that by pulling the free end of the line, the same can be drawn taut, while at the same time provision is made for releasing the same.

In the accompanying drawing, I have illustrated in Figure 1 in perspective parts being broken away, a suitable form of device mounted upon a line between pulleys, embodying an application of my invention. Fig. 2 illustrates a modification.

1—2 indicate any suitable form of pulley such as might be employed for a clothes line, and 3 the line or rope mounted to travel upon said pulleys. 4 indicates a suitable pulley casing provided with a pulley 5 around which the free end 6 of the rope passes, said casing 4 having a projection 5' at the top which when pulled rightwardly between the fingers against the action of the lever 7 releases the rope. The said lever 7 is pivotally mounted at 8 as shown and is preferably provided with teeth such as 9 for insuring a tight grip upon the rope against the pulley 5 and the opposite end of the lever 7 is preferably provided with a ring or hole 10 through which the free end 11 of the rope may be suitably secured as shown. From the foregoing it will be seen that upon pulling the free end 6 of the rope, the same is drawn over the pulley 5 and the teeth 9 are forced against the rope with increased tension due to the corresponding pull upon the other end 11 of the rope. It will also be equally obvious that upon pressing the projection 5' in the direction of the ring 10 the free end 6 of the rope is released from the teeth 9 and the line may be slackened. This is a very convenient form of simple device which may be used in any emergency where such means are desired for controlling the tension of the line, and of course it will be understood that various modifications may be made in the construction and arrangement of parts without departing from the spirit of the invention as claimed.

I claim:

1. In a device of the class described, a pulley casing containing a pulley over which a rope may be passed, a lever pivoted in said casing adapted at one end to engage said rope and provided with means at the opposite end for engaging the other end of said rope, and in combination therewith means for gripping said pulley casing for releasing the tension of said lever upon said rope.

2. In a device of the class described, a pulley casing containing a pulley over which a rope may be passed, a lever pivoted in said casing adapted at one end to engage said rope and provided with means at the opposite end for engaging the other end of said rope, and in combination therewith means for gripping said pulley casing for releasing the tension of said lever upon said rope, said means for gripping said casing comprising an extension thereof adapted to be pinched between the fingers so as to be drawn in the direction of the ring end of said lever.

In testimony whereof I hereunto affix my signature.

ALPHONSE VANDERDONCK.